(12) United States Patent
Willey

(10) Patent No.: US 8,918,122 B2
(45) Date of Patent: Dec. 23, 2014

(54) SYSTEM AND METHOD FOR UNIFORM PAGING DISTRIBUTION

(75) Inventor: William Daniel Willey, Gilroy, CA (US)

(73) Assignee: BlackBerry Limited, Waterloo, Ontario (CA)

(*) Notice: Subject to any disclaimer, the term of this patent is extended or adjusted under 35 U.S.C. 154(b) by 957 days.

(21) Appl. No.: 12/866,692

(22) PCT Filed: Feb. 5, 2009

(86) PCT No.: PCT/US2009/033254
§ 371 (c)(1),
(2), (4) Date: Oct. 28, 2010

(87) PCT Pub. No.: WO2009/100244
PCT Pub. Date: Aug. 13, 2009

(65) Prior Publication Data
US 2011/0039553 A1    Feb. 17, 2011

Related U.S. Application Data

(60) Provisional application No. 61/027,279, filed on Feb. 8, 2008.

(51) Int. Cl.
*H04W 24/00* (2009.01)
*H04W 68/02* (2009.01)
*H04W 52/02* (2009.01)

(52) U.S. Cl.
CPC .......... *H04W 68/02* (2013.01); *H04W 52/0216* (2013.01)
USPC ........ 455/458; 455/426.1; 455/420; 455/421; 455/456.1; 455/574; 370/311; 370/318; 370/338

(58) Field of Classification Search
CPC ......................... H04W 52/0216; H04W 68/02
USPC .......... 455/458, 474, 426.1, 502, 343.2, 38.3, 455/127, 422.1; 370/311, 318, 338, 335, 370/354, 344
See application file for complete search history.

(56) References Cited

U.S. PATENT DOCUMENTS

| | | |
|---|---|---|
| 2005/0153751 A1 | 7/2005 | Bultan et al. |
| 2005/0282528 A1* | 12/2005 | Charpentier et al. ...... 455/414.2 |
| 2006/0262739 A1 | 11/2006 | Ramirez et al. |
| 2007/0184836 A1 | 8/2007 | Hc |
| 2012/0195240 A1* | 8/2012 | Kim et al. ..................... 370/311 |

FOREIGN PATENT DOCUMENTS

EP    1608196 A1    12/2005

OTHER PUBLICATIONS

"Paging DRX calculation in LT" (Nokia Corporation, Nokia Siemens Network (R2-080193, Jan. 14-18, 2008).*
NTT DoCoMo, Inc.; Title: Paging Consolidation; 3GPP TSG RAN WG2 #61; R2-081167; Sorrento, Italy, Feb. 11-15, 2008; 5 pgs.

(Continued)

*Primary Examiner* — Babar Sarwar
(74) *Attorney, Agent, or Firm* — Conley Rose, P.C.; J. Robert Brown, Jr.

(57) ABSTRACT

A method for downlink paging is provided. The method includes determining a number of bits of a user equipment identifier based on an on/off cycle of a user equipment and a paging group count. The method further includes assigning a paging frame in a communications channel, where the paging frame is selected based upon the on/off cycle of the user equipment, the paging group count, and the number of bits of the user equipment identifier.

22 Claims, 15 Drawing Sheets

(56) References Cited

OTHER PUBLICATIONS

Nokia Corporation, Nokia Siemens Networks; Title: Paging DRX Calculation in LTE; 3GPP TSG-RAN WG2 Meeting #60bis; R2-080193; Sevilla, Spain; Jan. 14-18, 2008; 4 pgs.
Yang, Suckchel et al.; Title: Adaptive Discontinuous Reception Mechanism for Power Saving in UMTS; IEEE; 2007; 3 pgs.
Qualcomm Europe; Title: Paging Mechanism; 3GPP TSG-RAN WG 2 meeting #60; R2-074811; Jeju, Korea; Nov. 5-9, 2007; 3 pgs.
Qualcomm Europe; Title: Paging Mechanism; 3GPP TSG-RAN WG2 Meeting #59-bis; R2-073995; Shanghai, China, Oct. 8-12, 2007; 4 pgs.
PCT International Search Report; PCT Application No. PCT/US2009/033254; Jul. 17, 2009; 6 pgs.
PCT Written Opinion of the International Searching Authority; PCT Application No. PCT/US2009/033254; Jul. 17, 2009; 11 pgs.
PCT International Preliminary Report on Patentability; PCT Application No. PCT/US2009/033254; Apr. 1, 2010; 13 pgs.
European Examination Report; Application No. 09709291.0; Dec. 9, 2011; 10 pages.
European Examination Report; European Patent Application No. 09709291.0-2412; Jan. 18, 2011; 6 pgs.
Canadian Office Action; Application No. 2,714,407; Oct. 31, 2012; 3 pages.
European Summons to Attend Oral Proceedings; Application No. 09709291.0; Oct. 31, 2013; 10 pages.
Canadian Office Action; Application No. 2,714,407; Jan. 10, 2014; 3 pages.

\* cited by examiner

|  | PGC=1 | PGC=2 | PGC=4 | PGC=8 | PGC=1 6 | PGC=3 2 | PGC=6 4 | PGC=1 28 | PGC=2 56 |
|---|---|---|---|---|---|---|---|---|---|
| DRX=32 Periodicity (frames) | 32 | 16 | 8 | 4 | 2 | Every | Every | Every | Every |
| DRX=64 Periodicity (frames) | 64 | 32 | 16 | 8 | 4 | 2 | Every | Every | Every |
| DRX=128 Periodicity (frames) | 128 | 64 | 32 | 16 | 8 | 4 | 2 | Every | Every |
| DRX256 Periodicity (frames) | 256 | 128 | 64 | 32 | 16 | 8 | 4 | 2 | Every |

Figure 5

|  | PGC=1 | PGC=2 | PGC=4 | PGC=8 | PGC=16 | PGC=32 |
|---|---|---|---|---|---|---|
| DRX=32 Periodicity (frames) | 32 | 16 | 8 | 4 | 2 | Every |
| DRX=64 Periodicity (frames) | 32 | 16 | 8 | 4 | 2 | Every |
| DRX=128 Periodicity (frames) | 32 | 16 | 8 | 4 | 2 | Every |
| DRX256 Periodicity (frames) | 32 | 16 | 8 | 4 | 2 | Every |

SYSTEM AND METHOD FOR UNIFORM PAGING DISTRIBUTION

CROSS-REFERENCE TO RELATED APPLICATIONS

This application is a filing under 35 U.S.C. 371 of International Application No. PCT/US20091033254 filed Feb. 5, 2009, entitled "System and Method for Uniform Paging Distribution" claiming priority to U.S. Provisional Application No. 61/027,279 filed on Feb. 8, 2008, which these applications are incorporated by reference herein in their entirety.

In traditional wireless telecommunications systems, transmission equipment in a base station transmits signals throughout a geographical region known as a cell. As technology has evolved, more advanced network access equipment has been introduced that can provide services that were not possible previously. This advanced network access equipment might include, for example, an enhanced node-B (eNB) rather than a base station or other systems and devices that are more highly evolved than the equivalent equipment in a traditional wireless telecommunications system. Such advanced or next generation equipment is typically referred to as long-term evolution (LTE) equipment. For LTE equipment, the region in which a wireless device can gain access to a telecommunications network might be referred to by a name other than "cell", such as "hot spot". As used herein, the term "cell" will be used to refer to any region in which a wireless device can gain access to a telecommunications network, regardless of whether the wireless device is a traditional cellular device, an LTE device, or some other device.

Devices that might be used by users in a telecommunications network can include both mobile terminals, such as mobile telephones, personal digital assistants, handheld computers, portable computers, laptop computers, tablet computers and similar devices, and fixed terminals such as residential gateways, televisions, set-top boxes and the like. Such devices will be referred to herein as user equipment or UE.

Services that might be provided by LTE-based equipment can include broadcasts or multicasts of television programs, streaming video, streaming audio, and other multimedia content. Such services are commonly referred to as multimedia broadcast multicast services (MBMS). An MBMS might be transmitted throughout a single cell or throughout several contiguous or overlapping cells. The MBMS may be communicated from an eNB to a UE using point-to-point (PTP) communication or point-to-multipoint (PTM) communication.

In wireless communication systems, transmission from the network access equipment (e.g., eNB) to the UE is referred to as a downlink transmission. Communication from the UE to the network access equipment is referred to as an uplink transmission.

Some UEs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers.

A UE may be powered by a portable power supply, such as a battery. During operation of the UE, the power supply is depleted requiring recharging or replacement. To increase the operational period of a UE efforts are made to reduce the energy requirements of the UE.

In some implementations, a UE is maintained in a low-power, sometimes referred to as a sleep mode, and periodically wakes up to monitor a paging channel to determine whether the UE is paged. If the UE is not paged, the UE returns to a sleep, or other low-power, mode, thereby to minimize power dissipation. The page of the UE must appropriately identify the UE so that the UE is aware that it, and not a different UE, is being paged. At least one proposed system provides for a two-stage paging scheme in which two different channels are used to send a page to page a UE. The 3GPP (3rd Generation Partnership Project) is considering proposals for a new air interface, referred to as Long Term Evolution (LTE). In the proposed paging scheme, the UE wakes up and monitors a first channel. Assignment information, if sent thereon, provides information usable by the UE to then tune to the second paging channel. Proposals provide for the communication on the first paging channel of an identifier, referred to as a P-RNTI. Any UE that detects the P-RNTI communicated on the first paging channel then also monitors the second paging channel for a page message sent thereon. In one existing proposal, a unique UE identifier, such as a 32-bit TMSI (Temporary Mobile Subscriber Identity) or International Mobile Subscriber Identifier (IMSI), is sent on the second paging channel to page the mobile station. Because the unique identifier uniquely identifies the UE, only the UE that is intended to be paged is paged by the transmission. The second paging channel is, however, also used for traffic services, such as the communication of voice traffic or data traffic.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 depicts a table showing the periodicity in frames used for paging with various possible values for Paging_Group_Count and Paging_DRX_Period using Formula 1;

FIG. 8 depicts a table showing the periodicity in frames used for paging with possible values for Paging_Group_Count and Paging_DRX_Period using Formula 2;

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. In addition, while the specific examples may refer to LTE systems, it is envisioned that the disclosed embodiments may be used in any communication system.

Figure 1:
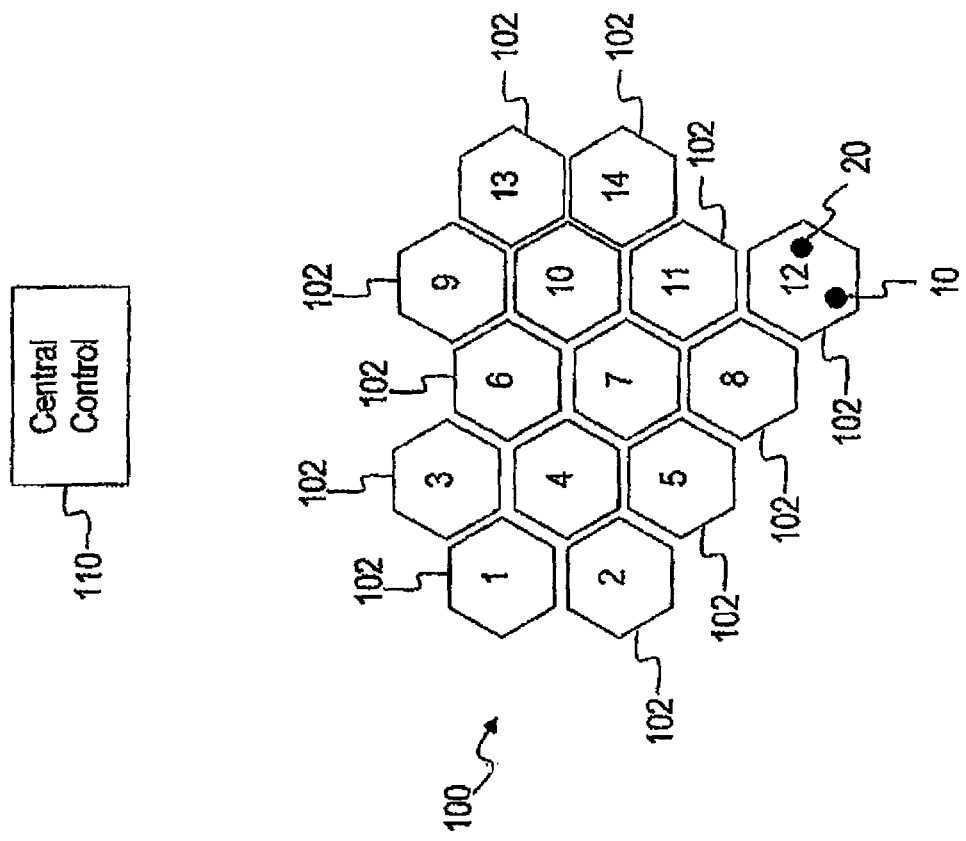
FIG. 1 illustrates an exemplary cellular network.

FIG. 1 illustrates an exemplary cellular network 100 according to an embodiment of the disclosure. The cellular network 100 may include a plurality of cells $102_1$, $102_2$, $102_3$, $102_4$, $102_5$, $102_6$, $102_7$, $102_8$, $102_9$, $102_{10}$, $102_{11}$, $102_{12}$, $102_{13}$, and $102_{14}$ (collectively referred to as cells 102). As is apparent to persons of ordinary skill in the art, each of the cells 102 represents a coverage area for providing cellular services of the cellular network 100 through communication from a network access equipment (e.g., eNB). While the cells 102 are depicted as having non-overlapping coverage areas, persons of ordinary skill in the art will recognize that one or more of the cells 102 may have partially overlapping coverage with adjacent cells. In addition, while a particular number of the cells 102 are depicted, persons of ordinary skill in the art will recognize that a larger or smaller number of the cells 102 may be included in the cellular network 100.

One or more UEs 10 may be present in each of the cells 102. Although only one UE 10 is depicted and is shown in only one cell $102_{12}$, it will be apparent to one of skill in the art that a plurality of UEs 10 may be present in each of the cells 102. A network access equipment 20 in each of the cells 102 performs functions similar to those of a traditional base station. That is, the network access equipments 20 provide a radio link between the UEs 10 and other components in a telecommunications network. While the network access equipment 20 is shown only in cell $102_{12}$, it should be understood that network access equipment would be present in each of the cells 102. A central control 110 may also be present in the cellular network 100 to oversee some of the wireless data transmissions within the cells 102.

Figure 2:
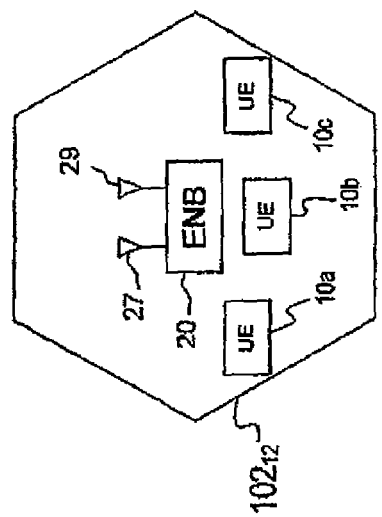
FIG. 2 depicts a more detailed view of a cell shown in FIG. 1.

FIG. 2 depicts a more detailed view of the cell $102_{12}$. The network access equipment 20 in cell $102_{12}$ may promote communication via a transmitter 27, a receiver 29, and/or other well known equipment. Similar equipment might be present in the other cells 102. A plurality of UEs 10 are present in the cell $102_{12}$, as might be the case in the other cells 102. In the present disclosure, the cellular systems or cells 102 are described as engaged in certain activities, such as transmitting signals; however, as will be readily apparent to one skilled in the art, these activities would in fact be conducted by components comprising the cells.

In each cell, the transmissions from the network access equipment 20 to the UEs 10 are referred to as downlink transmissions, and the transmissions from the UEs 10 to the network access equipment 20 are referred to as uplink transmissions. The UE may include any device that may communicate using the cellular network 100. For example, the UE may include devices such as a cellular telephone, a laptop computer, a navigation system, or any other devices known to persons of ordinary skill in the art that may communicate using the cellular network 100.

Figure 3:
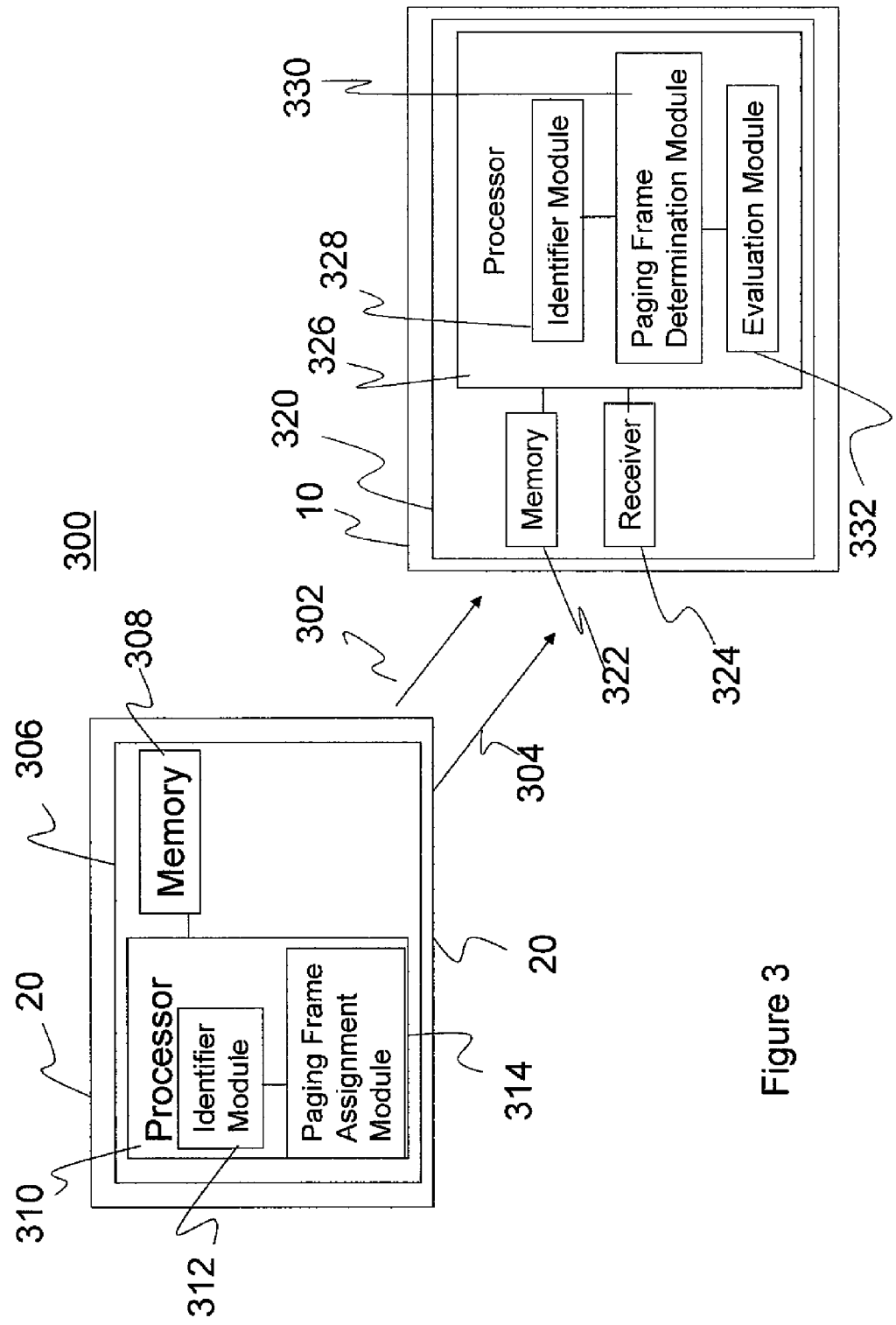
FIG. 3 illustrates another view of a radio communication system.

Referring to FIG. 3, another view of radio communication system, shown generally at 300, provides for radio communications with mobile stations, of which the mobile station 10 is representative. The communication system, in the exemplary implementation, forms a 3GPP (3rd Generation Partnership Project) LTE (Long Term Evolution) system that provides for both voice and data communication services by, and with, mobile stations, such as the mobile station 10. When a communication service is to be established with a mobile station, the mobile station is paged in order to alert the mobile station of the pending communication service and thereby to permit the mobile station to take further action to accept the communication service and enter into a state to permit its delivery or performance. As mentioned previously, a two-stage paging method is to be provided. That is to say, when paging a mobile station, hereinafter referred to as a UE (User Equipment) the infrastructure uses two different channels to send a page. Page messages, originated at the network, are sent upon channels defined upon a radio air interface that extends beyond the network and the mobile stations. While the following description shall describe exemplary operation in which the communication system forms a 3GPP LTE system, the teachings set forth herein are analogously implementable in other types of communication systems.

Pursuant to paging in the 3GPP LTE-compliant system, the UE is assigned to a certain paging occasion within an on/off cycle, e.g., a DRX (Discontinuous Reception) cycle. The UE 10 wakes up and turns on its receiver and first receives a control channel, referred to as an L1/L2 control channel, a PD-CCH (Physical Downlink Control Channel), or a Downlink Control Channel (DL-CCH). The DL-CCH includes resource block assignment information. The resource block assignment includes, e.g., information such as the frequency and time to indicate to the UE in what manner to receive the associated paging message. Then, the paging message is sent on a PCH (Paging Channel) transport channel. The PCH transport channel is mapped to a PDSCH (Physical Downlink Shared Channel) physical channel.

Different values are used for the RNTI on the DL-CCH depending upon what is subsequently sent on the PDSCH. A P-RNTI is used on the DL-CCH when paging is sent on the PDSCH. When paging a UE, the network uses a value (i.e. the P-RNTI) for the RNTI to indicate paging on the PDSCH. If the UE that is to be paged, and the network uses the P-RNTI to form the content of the DL-CCH message. In 3GPP specification number 36.212v200, a 16-bit cyclic redundancy check (CRC) is used for error detection of the DL-CCH. This section also specifies that, for the DL-CCH message, an exclusive OR operation is performed on the computed CRC, and an RNTI. The result of the exclusive OR operation is appended to the payload. Then both the RNTI and the result of the exclusive OR operation are sent on the DL-CCH. When the DL-CCH is used for paging the RNTI will be the P-RNTI which would typically be a fixed 16-bit value. In some cases multiple P-RNTIs could be used for paging, each of the multiple P-RNTIs equal to a fixed 16-bit value.

The DL-CCH is represented by the arrow 302, and the PCH is represented by the arrow 304. The channels are defined upon the radio air interface and are monitored by the UE 10 in manners as noted above. As also noted above, the PCH is also used for traffic services to communicate voice and data traffic.

An apparatus 306 is embodied at a network entity, here a base transceiver station and operates pursuant to paging of a UE, here the UE 10. The apparatus 306 includes a memory 308 and a processor 310. The processor 310 further includes an identifier module 312 and a paging frame assignment module 314. The elements 312 and 314 are functionally represented, implementable in any desired manner, including algorithms executable by processing circuitry, software, hardware or firmware. And, while the apparatus is here shown to be embodied at a single network entity, in other representations, the elements are distributed amongst more than one entity.

When a communication service is to be performed with the UE 10, the network access equipment 20 retrieves from memory a paging group count. The paging group count is a variable that in one embodiment is determined by the network access equipment. The paging group count variable is often determined depending upon the paging load. However, other factors may drive the determination of the paging group count.

To determine which frame in the DLCCH is used for paging, the user equipment identifier, e.g., a TMSI, a 32-bit value or IMSI, that uniquely identifies the UE is provided to the identifier module 312. The identifier module 312 operates to define a number of bits of the user equipment identifier based on the on/off cycle of the user equipment and a paging group count of the user equipment. The number of bits of the user equipment identifier is sent to the paging frame assignment module 314. The paging frame assignment module 314 assigns a paging frame based on the on/off cycle of the user equipment being paged, the paging group count, and the number of bits of the user equipment identifier provided by the identifier module 312. A page message generator (not shown) forms a first message for transmission upon the DL-CCH and, thereafter, a second message that is sent upon the PCH.

The UE 10 includes further apparatus, shown at 320 of an embodiment of the present disclosure. The apparatus 320 is also functionally represented, formed of entities implementable in any desired manner, including by algorithms executable by processing circuitry, hardware, software, or firmware. The apparatus 320 includes a receiver 322, a memory 324 and a processor 326. The processor 326 further comprises an identifier module 328, a paging frame determination module 330, and an evaluation module 332.

The receiver 324 operates to detect a page message sent on the first paging channel, here the DL-CCH 22. When a page message is sent on the DL-CCH 22 and delivered to the mobile station 10, the receiver 324 receives its contents, provides values of the detected contents to the evaluation module 332.

The memory is configured to store a paging group count. In one embodiment, the paging group count is transmitted to the user equipment when the user equipment first communicates with the network access equipment, or at any time when the network access equipment determines that the paging group count needs to be updated. In one embodiment, the network access equipment may vary the paging group count as the paging load varies.

The identifier module 328 performs the same function as the identifier module 312 in the network access equipment 20.

The paging frame determination module utilizes the number of bits of the user equipment identifier received from the identifier module, along with the on/off cycle of the UE and the paging group count to determine which frames in the received communication channel are paging frames. The evaluation module 332 then evaluates the paging frames to determine if the UE may be paged. If the UE receives an indication in the paging frame that a page may be coming, then the UE will monitor the second paging channel for the paging message.

Figure 4:
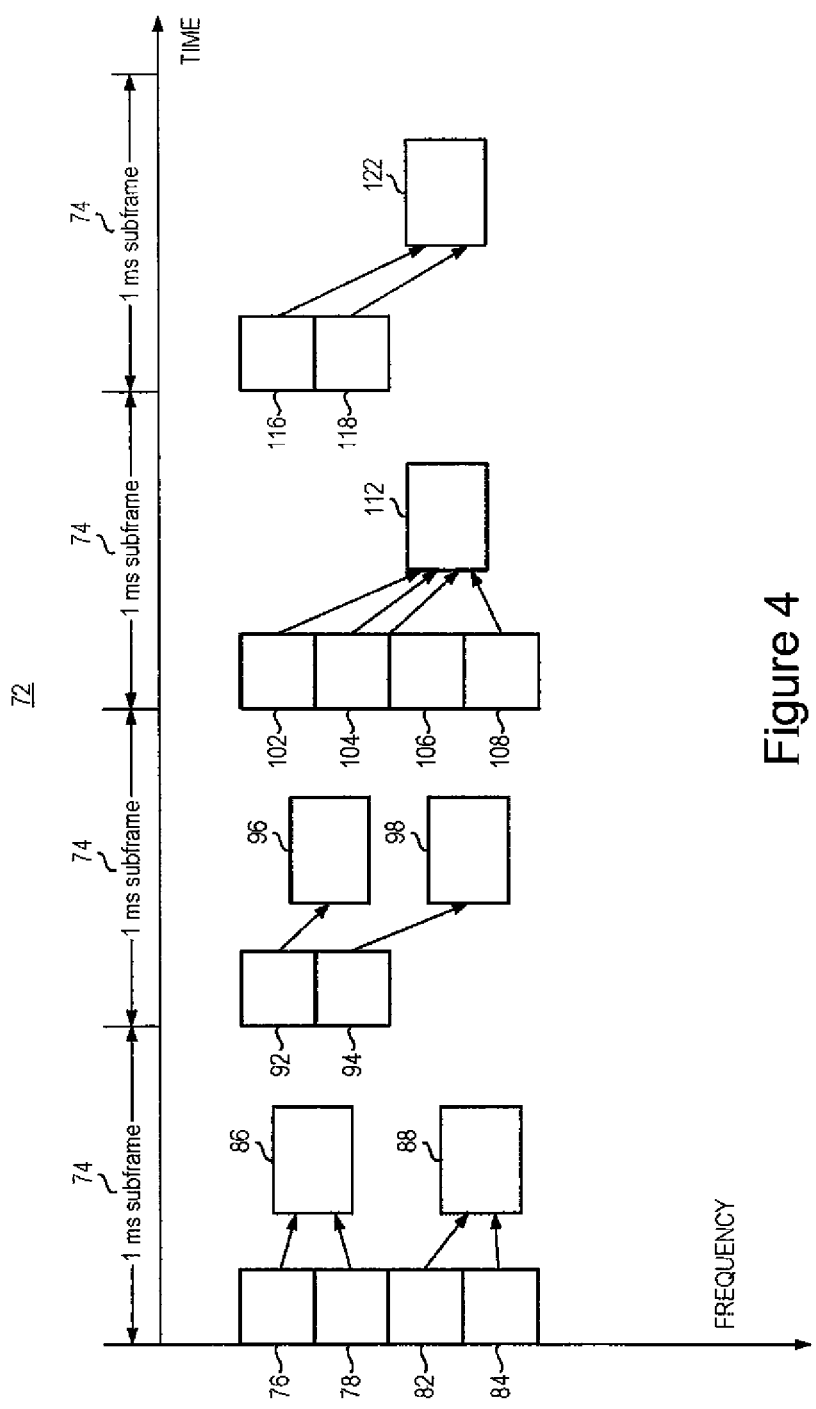
FIG. 4 illustrates a representation of an exemplary paging in a 3GPP LTE radio air interface.

FIG. 4 illustrates a representation, shown generally at 72, of exemplary paging in a 3GPP LTE radio air interface. Here, the first four 1 ms sub frames 74 of a 10 ms frame are shown. Each sub frame 74 includes multiple DL-CCH channels, and messages sent thereon, followed by one or more pages generated on one or more paging channels.

In the first sub frame, four DL-CCHs 76, 78, 82 and 84 are shown. Each of the DL-CCHs is defined upon different OFDM sub carrier frequencies. The channels 76 and 78 here send assignment information that direct UEs to receive their pages in a first PCH page message 86. The channels 82 and 84 here send assignment information directing UEs to receive their pages sent on a second PCH 88. Messages sent on the channels 86 and 88 are transmitted using different OFDM sub carrier frequencies.

The second sub frame 74 illustrates DL-CCHs 92 and 94. Messages generated on each of these two channels are transmitted using different OFDM sub carrier frequencies. The channel 92 has assignment information that directs a UE to receive its page on the PCH 96. The channel 94 has assignment information that directs a UE to receive its page on the PCH 98. The page messages 96 and 98 are transmitted using different OFDM sub carrier frequencies. A page message sent on the channel 96 is sent on a different set of OFDM sub carrier frequencies than those used by the channel 92. Likewise, the page message sent on the channel 98 is sent on a different set of OFDM sub carrier frequencies than the frequencies used by the channel 94.

The third sub frame 74 shows four DL-CCHs, 102, 104, 106, and 108. Each of the four channels is defined upon different OFDM sub carrier frequencies. Messages sent thereon all have assignment information directing UEs to receive their pages on a paging channel 112. The page message sent on the paging channel 112 is sent on a different set of sub carrier frequencies than those upon which any of the channels 102-108 are defined.

In the fourth sub frame 74, two DL-CCHs 116 and 118 are defined. Messages broadcast thereon both have assignment information directing UEs to receive their pages on a paging channel 122. The page message sent on the paging channel 122 is sent on a different set of sub carrier frequencies than those that define either of the channels 116 or 118.

Previously, formulas for assigning or determining paging frames have been proposed. One such formula is Formula 1 which is SFN mod Paging_DRX_Period=(Paging_DRX_Period div Paging_Group_Count)*(IMSI mod Paging_Group_Count), where SFN=the system frame number of the frame being considered, Paging_DRX_Period=$2^i$, in units of 10 ms, where 1=Integer (5, 6, 7, 8), resulting in DRX Cycle lengths values of 0.32, 0.64, 1.28 and 2.56 seconds, and Paging_Group_Count=$2^n$, where n=Integer (0, 1, 2, 3, 4, 5, 6, 7, 8). A paging occasion, e.g., which frame is a paging frame, is determined when the right hand side of the equation matches the left hand side of the equation. In the above formula, div represents an integer divide operation. I.e. if a=b div c, then a is equal to the integer portion of b divided by c; any remainder left over after the division is discarded. In the above formula, mod represents a modulo operation. I.e. if a=b mod c, then a is equal to any remainder left over after dividing b by c; if there is no remainder, then a is equal to zero.

Figure 6:
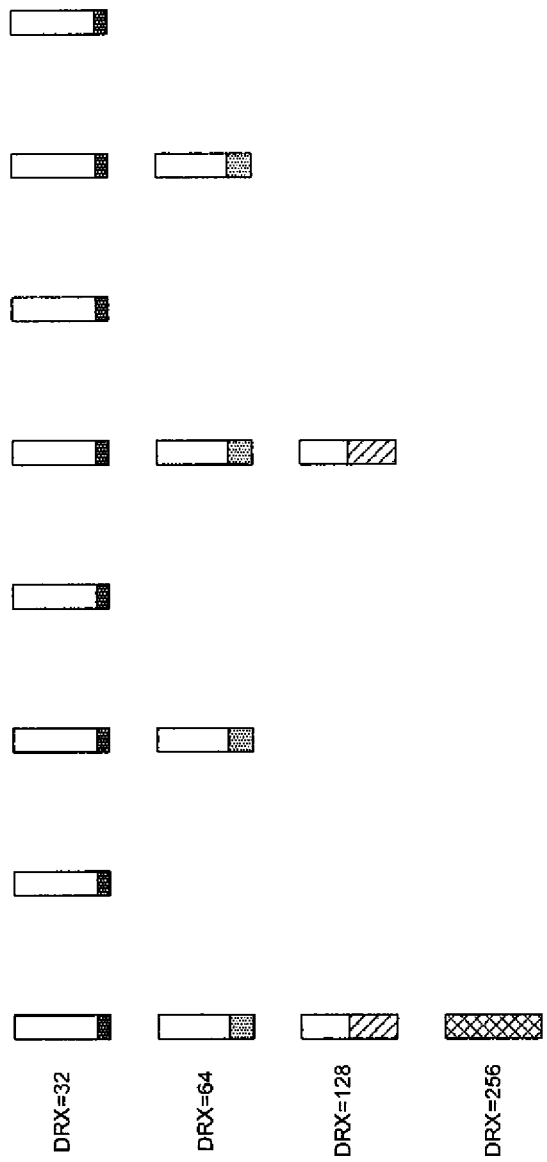
FIG. 6 illustrates paging load distribution resulting from using Formula 1 and Paging_Group_Count is equal to 1.

FIG. 5 depicts a table that shows the periodicity in frames used for paging with the various possible values for Paging_Group_Count and Paging_DRX_Period when formula 1 is used. As can be seen from the table when different DRX period values are used by different UEs, a different number of available frames would be used for the various DRX values. For example, if Paging_Group_Count were 1, a paging frame would occur once every 32 frames, thus 1 of 32 frames would be used for paging UEs with DRX period of 32. However, for DRX period of 64, a paging frame occurs once every 64 frames, therefore, half as many frames would be used for DRX period of 64. Thus, a quarter of frames would be used for DRX period of 128, and an eighth would be used for DRX period of 256. Suppose that in a period of 256 frames that there are enough pages for UEs with DRX equal to 256 to fill one frame. Also, suppose that there are an equal number of pages for UEs with DRX equal to 128, 64, and 32. The frames used for DRX=256 are shared with UEs using the other DRX values. As can be seen from FIG. 6, there will be too much paging load in the frames used for UEs with DRX=256.

Figure 7:
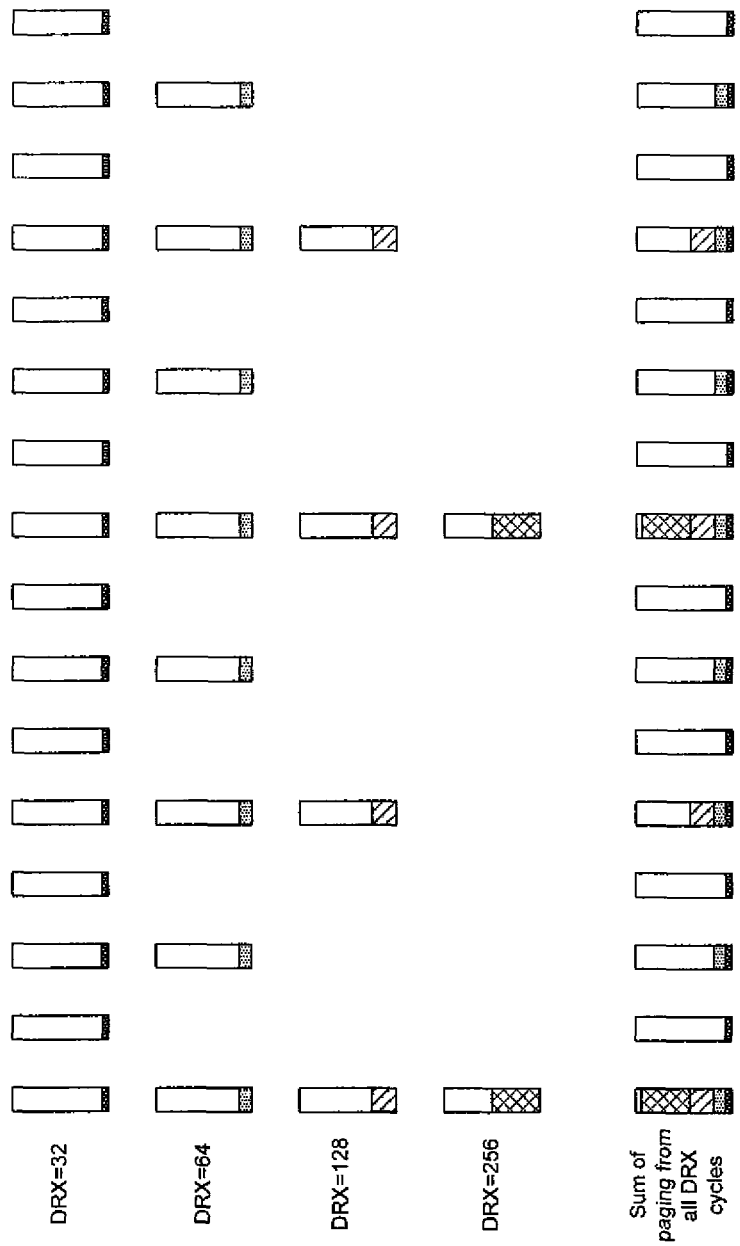
FIG. 7 illustrates paging load distribution resulting from using Formula 1 and Paging_Group_Count is equal to 2.

In order to address this, the Paging_Group_Count could be increased to 2. The result, however, would be that twice as many frames (e.g., 1 of 16 for the DRX cycle equal to 32 case) would then be used for paging. As can be seen from FIG. 7, the frames for the UEs with DRX=256 would still be heavily loaded and even a slight increase in the paging load for these frames would require a further increase of Paging_Group_Count, leading to 1 of 8 frames used for paging for the DRX cycle equal to 32 case.

In one embodiment, another formula can be utilized such that the frames for paging can be allocated evenly regardless of DRX period. In this embodiment, the percentage of the available frames that can be used for paging can still be varied. The number of paging groups broadcast in the system information will be applied to the shortest DRX period and larger DRX cycles will have larger numbers of paging occasions per DRX cycle. A proposed formula to calculate paging occasions is:

Formula 2 which is SFN mod Paging_DRX_Period==(32 div Paging_Group_Count)*(IMSI mod $[2^{(n+i-5)}]$). The 32 and 5 in the above formula refer to the minimum DRX cycle, $2^5=32$. A paging occasion, e.g., which frame is a paging frame, is determined when the right hand side of the equation matches the left hand side of the equation. Formula 2 can be written more generally as SFN mod Paging_DRX_Period==(x div Paging_Group_Count)*(z), wherein x comprises the minimum DRX cycle and wherein z comprises a number of bits of the user equipment identifier, the number of bits determined based upon the DRX cycle and the paging group count.

FIG. 8 shows the periodicity in frames used for paging with the various possible values for Paging_Group_Count and Paging_DRX_Period with the proposed formula 2.

Figure 9:
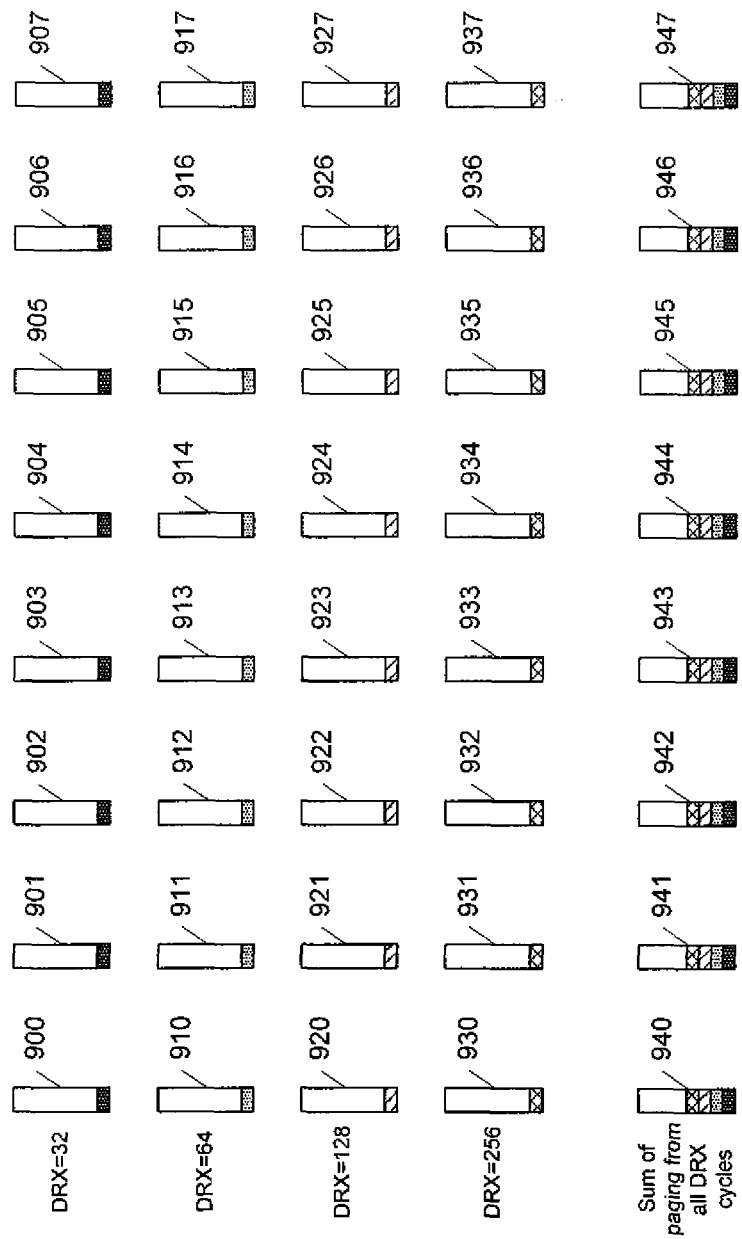
FIG. 9 illustrates paging load distribution resulting from using Formula 2.

FIG. 9 illustrates the benefit of the proposed change with respect to the Formula 2. The paging load is distributed more evenly among the frames. A much higher paging load could be accommodated without allocating more than 1 of 32 frames for paging. In this particular example, Paging_Group_Count is equal to one. Pages are contained in 10 ms paging frames 940, 941, 942, 943, 944, 945, 946, and 947. In this particular example, the system frame numbers (SFN) for frames 940, 941, 942, 943, 944, 945, 946, and 947 are 0, 32, 64, 96, 128, 160, 192, and 224, respectively. The amount of paging in the frames for UEs having DRX periods of 32, 64, 128, and 256 are shown by 900 . . . 907, 910 . . . 917, 920 . . . 927, and 930 . . . 937, respectively. The sum of the pages for the UEs having the various DRX cycles is shown in frames 940, 941, 942, 943, 944, 945, 946, and 947. UEs with DRX cycle of 32 will all have paging frames 940, 941, 942, 943, 944, 945, 946, and 947 as their paging occasions. A UE with DRX cycle of 64 will have either paging frame 940 or 941 as a paging occasion depending upon the value of the least significant bit of its IMSI; likewise a UE with DRX cycle of 64 will also have either paging frame 942 or 943 and either paging frame 944 or 945 and either paging frame 946 or 947 based upon the least significant bit of its IMSI. A UE with DRX cycle of 128 will have one of paging frames 940, 941, 942, or 943 as a paging occasion depending upon the value of the least significant two bits of its IMSI; likewise a UE with DRX cycle of 128 will also have one of paging frames 944, 945, 946 or 947 based upon the least significant two bits of its IMSI. A UE with DRX cycle of 256 will have one of paging frames 940, 941, 942, 943, 944, 945, 946 or 947 based upon the least significant three bits of its IMSI.

Figure 10:
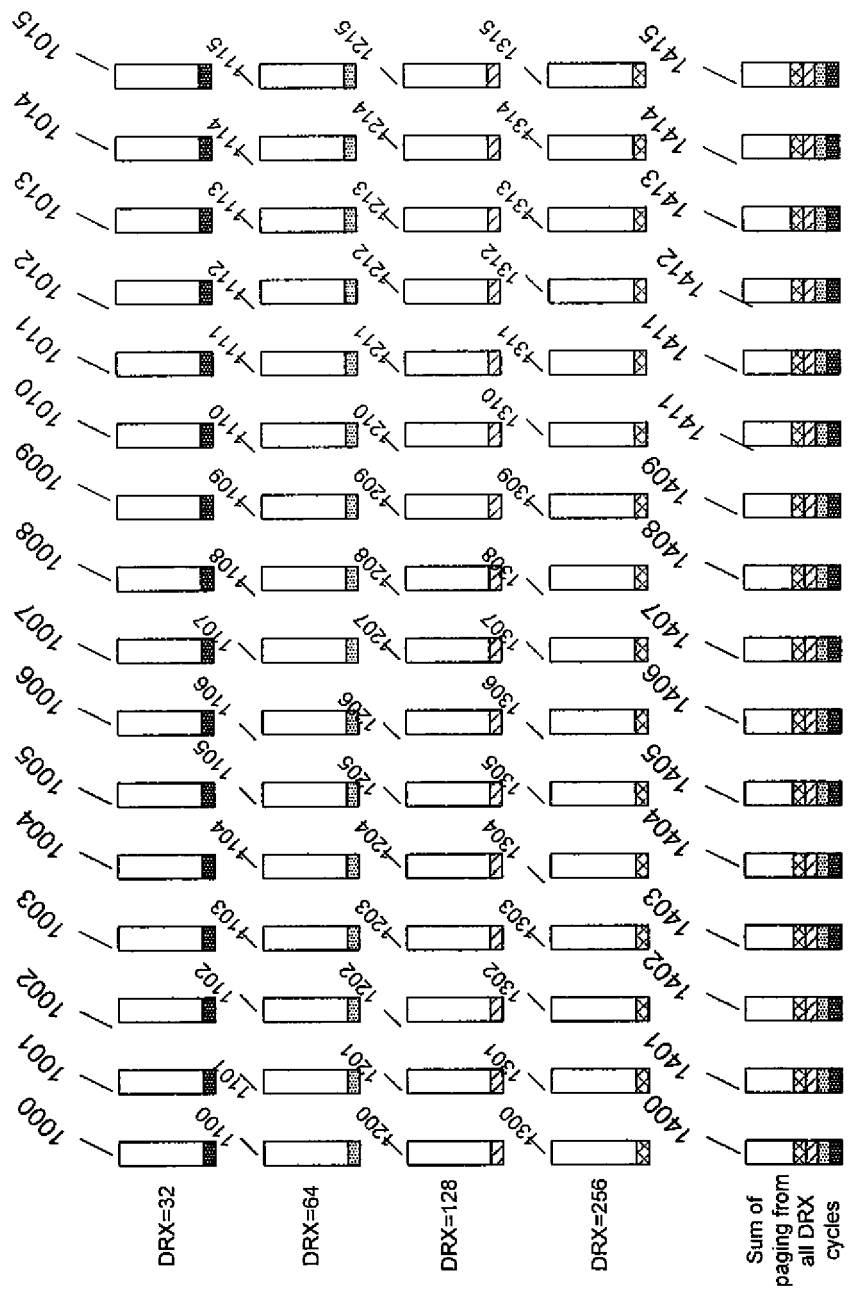
FIG. 10 illustrates paging load distribution resulting from using Formula 2.

FIG. 10 also illustrates the benefit of the proposed change with respect to the Formula 2. The paging load is distributed more evenly among the frames. In this particular example, Paging_Group_Count is equal to two. Pages are contained in 10 ms paging frames 1400, 1401, 1402, 1403, 1404, 1405, 1406, 1407, 1408, 1409, 1410, 1411, 1412, 1413, 1414, 1415. In this particular example, the system frame numbers (SFN) for frames 1400, 1401, 1402, 1403, 1404, 1405, 1406, 1407, 1408, 1409, 1410, 1411, 1412, 1413, 1414, 1415 are 0, 16, 32, 48, 64, 80, 96, 112, 128, 144, 160, 176, 192, 208, 224 and 240, respectively. The amount of paging in the frames for UEs having DRX periods of 32, 64, 128, and 256 are shown by 1000 . . . 1015, 1100 . . . 1115, 1200 . . . 1215, and 1300 . . . 1315, respectively. The sum of the pages for the UEs having the various DRX cycles is shown in frames 1400, 1401, 1402, 1403, 1404, 1405, 1406, 1407, 1408, 1409, 1410, 1411, 1412, 1413, 1414, 1415. In this example, there is twice as much paging as shown in FIG. 9. A UE with DRX cycle of 32 will have either paging frame 1400 or 1401 as a paging occasion depending upon the value of the least significant bit of its IMSI; likewise a UE with DRX cycle of 32 will choose other paging frames based upon the least significant bit of its IMSI. A UE with DRX cycle of 64 will have one of paging frames 1400, 1401, 1402, or 1403 as a paging occasion depending upon the value of the least significant two bits of its IMSI; likewise a UE with DRX cycle of 64 will choose other paging frames based upon the least significant two bits of its IMSI. A UE with DRX cycle of 128 will have one of paging frames 1400, 1401, 1402, 1403, 1404, 1405, 1406, or 1407 based upon the least significant three bits of its IMSI; likewise a UE with DRX cycle of 128 will choose other paging frames based upon the least significant three bits of its IMSI. A UE with DRX cycle of 256 will have one of paging frames 1400, 1401, 1402, 1403, 1404, 1405, 1406, 1407, 1408, 1409, 1410, 1411, 1412, 1413, 1414, or 1415 based upon the least significant four bits of its IMSI.

Figure 11:
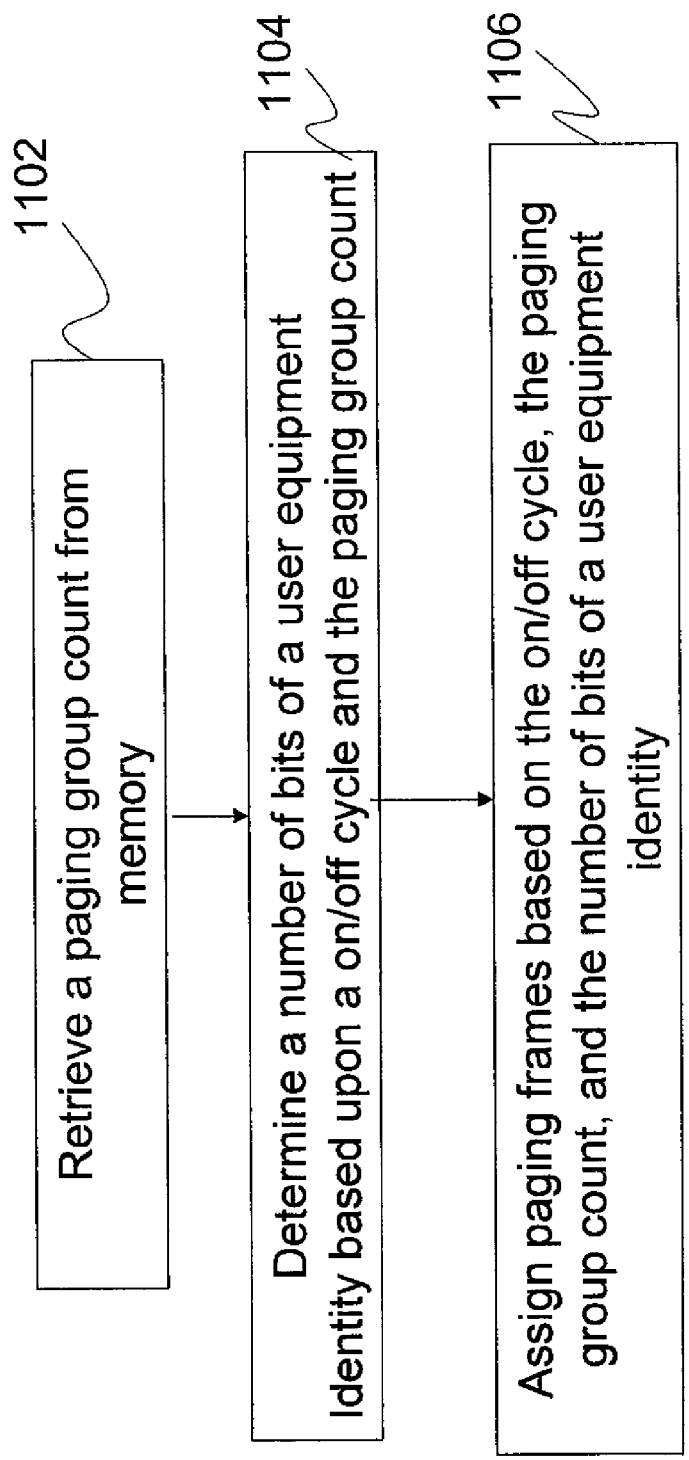
FIG. 11 illustrates a method for paging performed by a network access equipment.

FIG. 11 illustrates a method for paging performed by a network access equipment. At block 1102 the network access equipment retrieves a paging group count from memory. At block 1104, the network access equipment determines a number of bits of a user equipment identity (e.g., IMSI) based upon the on/off cycle (e.g., DRX cycle) of the user equipment and paging group count. At block 1106, the network access equipment assigns paging frames based on the on/off cycle, the paging group count, and the number of bits of the user equipment identifier.

Figure 12:
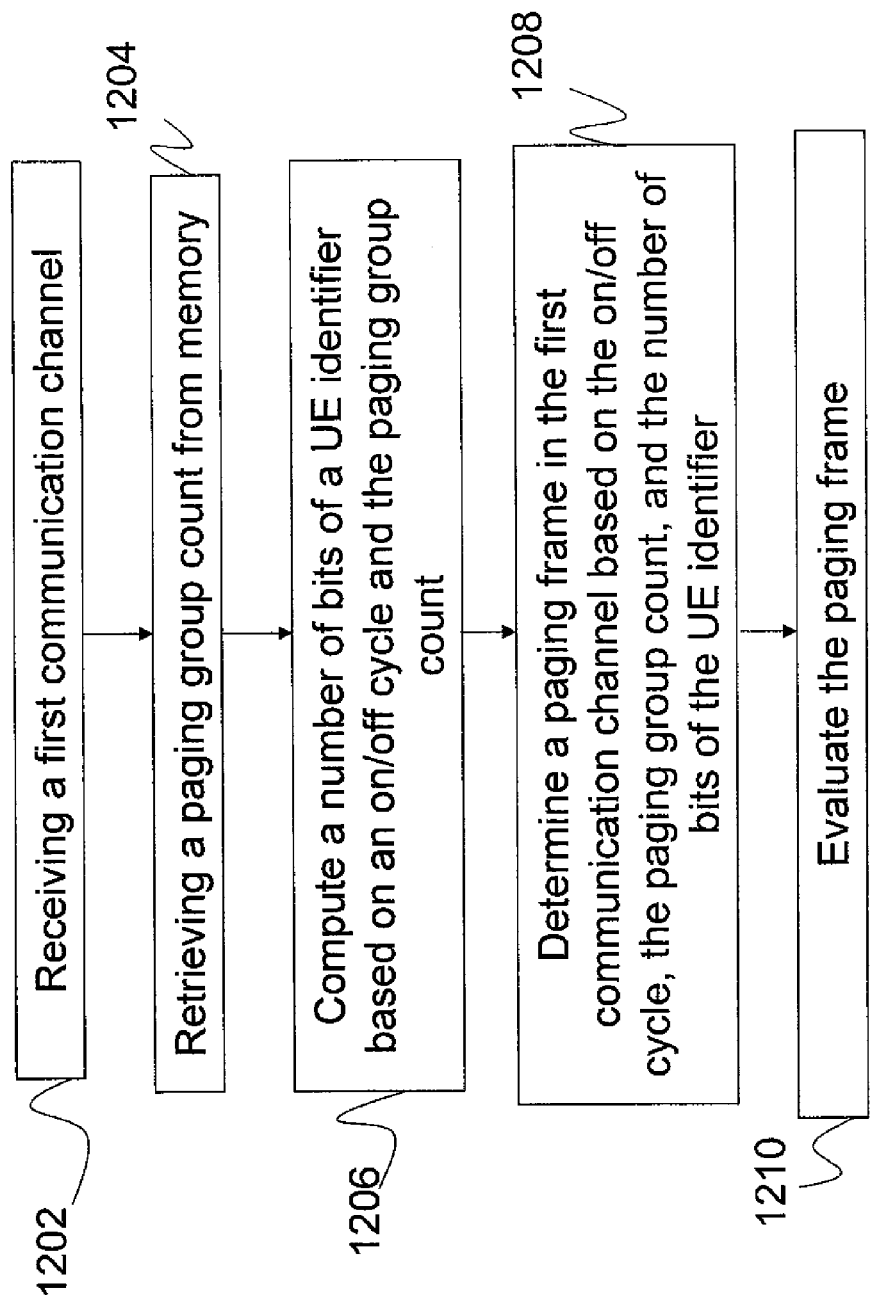
FIG. 12 illustrates a method for receiving a page performed by a UE.

FIG. 12 illustrates a method for paging performed by a UE. At block 1202, the UE receives a first communication channel. At block 1204, the UE retrieves a paging group count from memory. At block 1206, the UE computes a number of bits of the UE identifier based upon the on/off cycle and the paging group count. At block 1208, the UE determines a paging frame in the communication channel, where the paging frame is selected based upon the on/off cycle of the user equipment, the paging group count, and the number of bits of the user equipment identifier. At block 1210, the UE evaluates the paging frame to determine if the UE may be paged.

Figure 13:
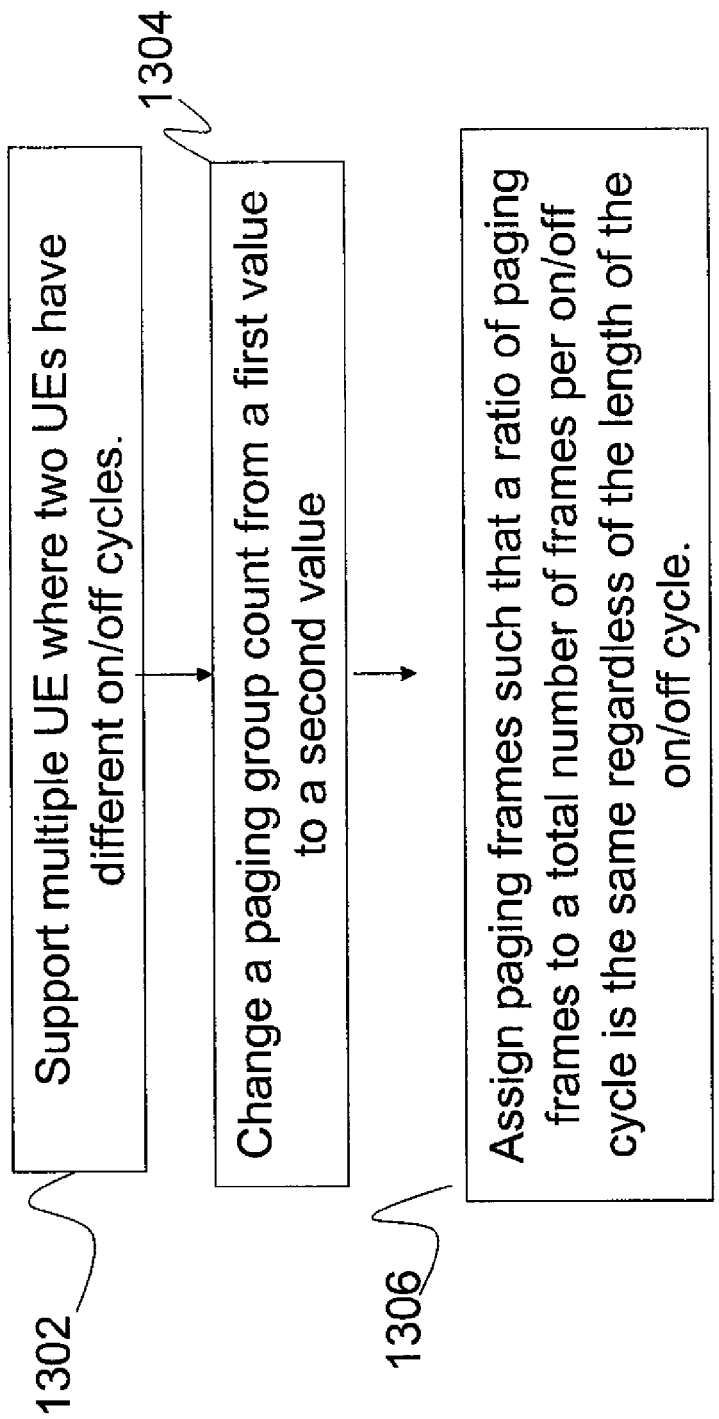
FIG. 13 illustrates another method of paging performed by a network access equipment.

FIG. 13 illustrates another method of paging in a network access equipment. At block 1302, the network access equipment supports multiple user devices where at least two user devices have different on/off cycles (e.g., DRX periods). At block 1304, the network access equipment changes a paging group count from a first value to a second value. At block 1306, the network access equipment assigns paging frames in a communication channel such that a ratio of paging frames to a total number of frames per on/off cycle is the same regardless of a length of the on/off cycle. As shown in FIGS. 8 and 9, the ratio of the number of paging frames to the total number of frames is the same for all DRX cycles when formula 2 is used.

Figure 14:
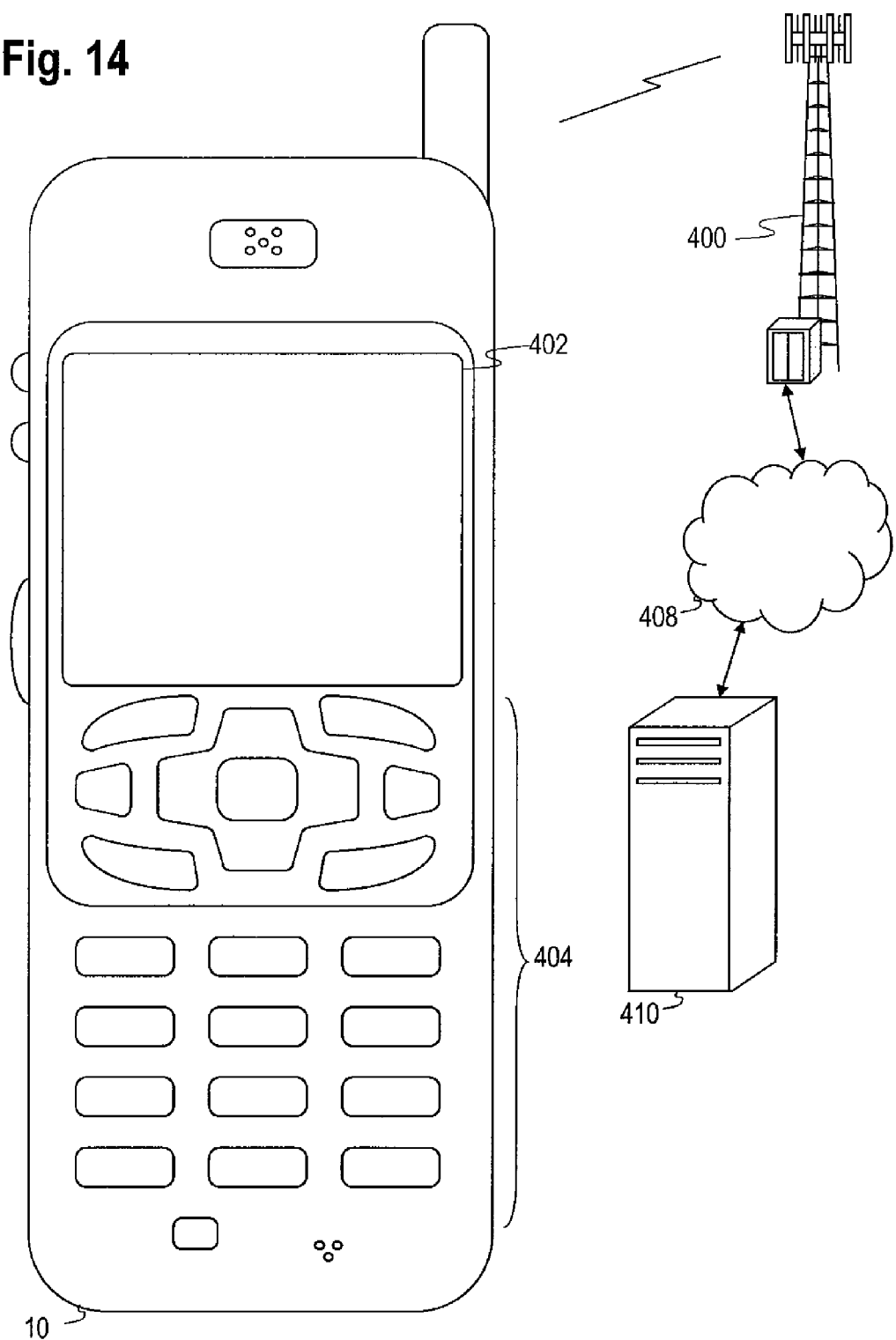
FIG. 14 illustrates a wireless communications system.

FIG. 14 illustrates a wireless communications system including an embodiment of the UE 10. The UE 10 is operable for implementing aspects of the disclosure, but the disclosure should not be limited to these implementations. Though illustrated as a mobile phone, the UE 10 may take various forms including a wireless handset, a pager, a personal digital assistant (PDA), a portable computer, a tablet computer, or a laptop computer. Many suitable devices combine some or all of these functions. In some embodiments of the disclosure, the UE 10 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 10 may be a portable, laptop or other computing device. The UE 10 may support specialized activities such as gaming, inventory control, job control, and/or task management functions, and so on.

The UE 10 includes a display 402. The UE 10 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 10 may present options for the user to select, controls for the user to actuate, and/or cursors or other indicators for the user to direct.

The UE 10 may further accept data entry from the user, including numbers to dial or various parameter values for configuring the operation of the UE 10. The UE 10 may further execute one or more software or firmware applications in response to user commands. These applications may configure the UE 10 to perform various customized functions in response to user interaction. Additionally, the UE 10 may be programmed and/or configured over-the-air, for example from a wireless base station, a wireless access point, or a peer UE 10.

Among the various applications executable by the UE 10 are a web browser, which enables the display 402 to show a web page. The web page may be obtained via wireless communications with a wireless network access node, a cell tower, a peer UE 10, or any other wireless communication network or system 400. The network 400 is coupled to a wired network 408, such as the Internet. Via the wireless link and the wired network, the UE 10 has access to information on various servers, such as a server 410. The server 410 may provide content that may be shown on the display 402. Alternately, the UE 10 may access the network 400 through a peer UE 10 acting as an intermediary, in a relay type or hop type of connection.

Figure 15:
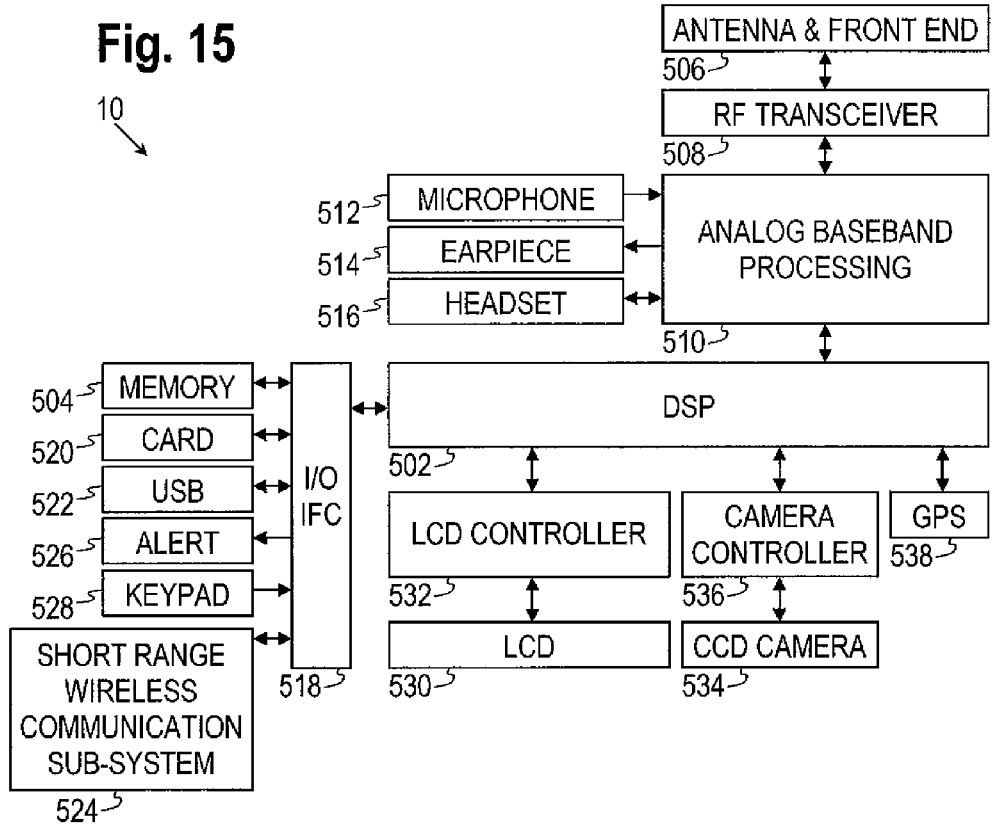
FIG. 15 illustrates a block diagram of a UE.

FIG. 15 shows a block diagram of the UE 10. While a variety of known components of UEs 10 are depicted, in an embodiment a subset of the listed components and/or additional components not listed may be included in the UE 10. The UE 10 includes a digital signal processor (DSP) 502 (which may comprise the processor 326 of FIG. 3) and a memory 504 which may include memory 322 of FIG. 3). As shown, the UE 10 may further include an antenna and front end unit 506, a radio frequency (RF) transceiver 508 (which may include receiver 324), an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 10 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 10 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 10 to send and receive information from a cellular network or some other available wireless communications network or from a peer UE 10. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 10 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 10 and may also enable the UE 10 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 10 to communicate wirelessly with other nearby mobile devices and/or wireless base stations.

The input/output interface 518 may further connect the DSP 502 to the alert 526 that, when triggered, causes the UE 10 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 10. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 10 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 10 to determine its position. Various other peripherals may also be included to provide additional functions, e.g., radio and television reception.

Figure 16:
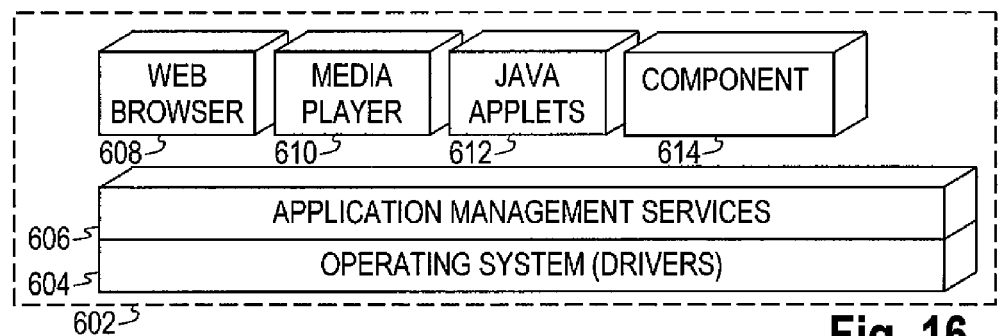
FIG. 16 illustrates a software environment.

FIG. 16 illustrates a software environment 602 that may be implemented by the DSP 502. The DSP 502 executes operating system drivers 604 that provide a platform from which the rest of the software operates. The operating system drivers 604 provide drivers for the wireless device hardware with standardized interfaces that are accessible to application software. The operating system drivers 604 include application management services ("AMS") 606 that transfer control between applications running on the UE 10. Also shown in FIG. 15 are a web browser application 608, a media player application 610, and Java applets 612. The web browser application 608 configures the UE 10 to operate as a web browser, allowing a user to enter information into forms and select links to retrieve and view web pages. The media player application 610 configures the UE 10 to retrieve and play audio or audiovisual media. The Java applets 612 configure the UE 10 to provide games, utilities, and other functionality. A component 614 might provide functionality related to the present disclosure.

Figure 17:
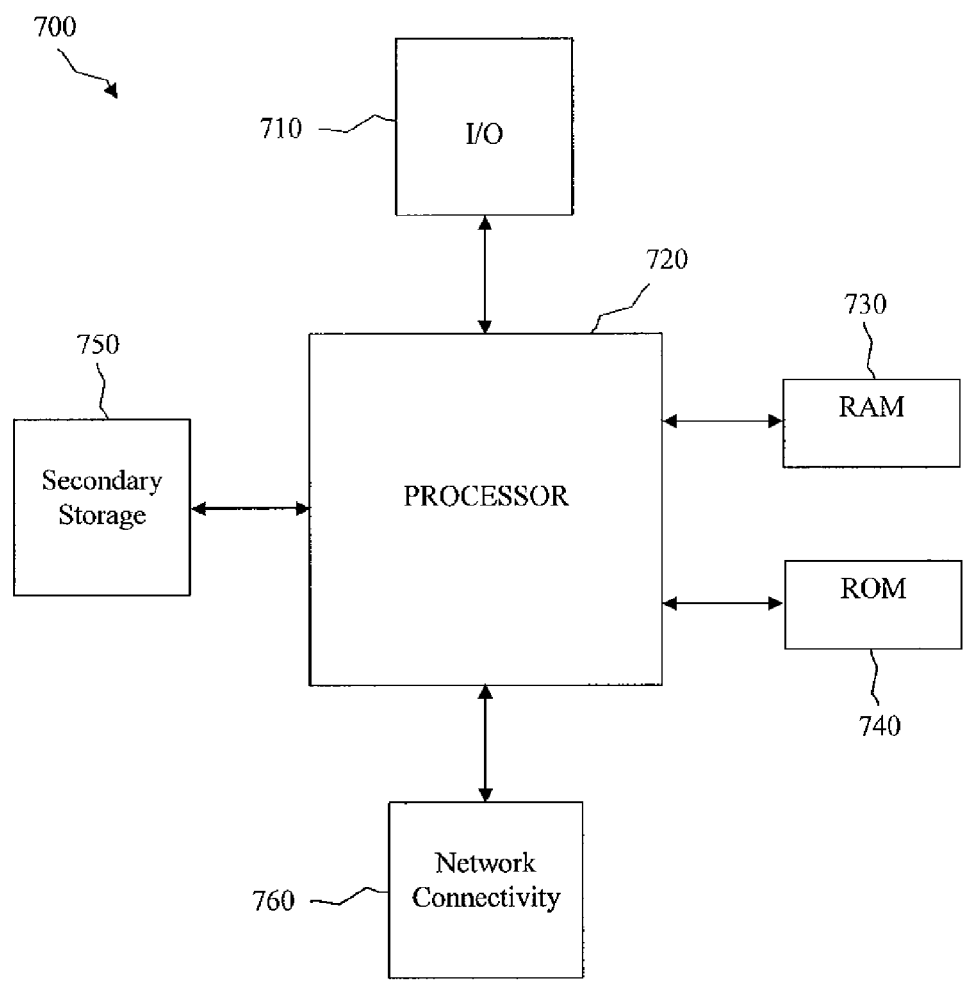
FIG. 17 illustrates a general-purpose computer.

The UEs 10, ENBs 20, and central control 110 of FIG. 1 and other components that might be associated with the cells 102 may include any general-purpose computer with sufficient processing power, memory resources, and network throughput capability to handle the necessary workload placed upon it. FIG. 17 illustrates a typical, general-purpose computer system 700 that may be suitable for implementing one or more embodiments disclosed herein. The computer system 700 includes a processor 720 (which may be referred to as a central processor unit or CPU) that is in communication with memory devices including secondary storage 750, read only memory (ROM) 740, random access memory (RAM) 730, input/output (I/O) devices 700, and network connectivity devices 760. The processor may be implemented as one or more CPU chips.

The secondary storage 750 is typically comprised of one or more disk drives or tape drives and is used for non-volatile storage of data and as an over-flow data storage device if RAM 730 is not large enough to hold all working data. Secondary storage 750 may be used to store programs which are loaded into RAM 730 when such programs are selected for execution. The ROM 740 is used to store instructions and perhaps data which are read during program execution. ROM 740 is a non-volatile memory device which typically has a small memory capacity relative to the larger memory capacity of secondary storage. The RAM 730 is used to store volatile data and perhaps to store instructions. Access to both ROM 740 and RAM 730 is typically faster than to secondary storage 750.

I/O devices 700 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 760 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 760 devices may enable the processor 720 to communicate with an Internet or one or more intranets. With such a network connection, it is contemplated that the processor 720 might receive information from the network, or might output information to the network in the course of performing the above-described method steps. Such information, which is often represented as a sequence of instructions to be executed using processor 720, may be received from and outputted to the network, for example, in the form of a computer data signal embodied in a carrier wave.

Such information, which may include data or instructions to be executed using processor 720 for example, may be received from and outputted to the network, for example, in the form of a computer data baseband signal or signal embodied in a carrier wave. The baseband signal or signal embodied in the carrier wave generated by the network connectivity 760 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 720 executes instructions, codes, computer programs, scripts which it accesses from hard disk, floppy disk, optical disk (these various disk-based systems may all be considered secondary storage 750), ROM 740, RAM 730, or the network connectivity devices 760. While only one processor 720 is shown, multiple processors may be present. Thus, while instructions may be discussed as executed by a processor, the instructions may be executed simultaneously, serially, or otherwise executed by one or multiple processors.

The below table shows examples of portions of IMSIs that would be used in order to calculate the paging occasions of a UE. The left most column lists a number of UEs, 10d-10y. The next column shows the paging DRX cycle being used by the UE. The next column shows the IMSI associated with the UE. The last two columns in the table reference the assigned paging frames referring back to FIG. 9 and FIG. 14, respectively. The IMSI is typically a 15-digit decimal number, although it sometimes has fewer than 15 digits. When encoded and transmitted in a message, it is often represented as a binary coded decimal (BCD), representing each decimal digit as four binary digits. When using bits of the IMSI to determine a paging occasion, the BCD form is preferably not used. It is currently contemplated in 3GPP that it may be desirable to protect the privacy of the subscriber by transmitting a subset of the IMSI bits to the eNB rather than the whole IMSI. The next column shows an example of a subset of the IMSI bits used for determining the paging occasion; these bits would be transmitted to the eNB. A preferred way to derive a subset of the IMSI bits would be to convert the decimal representation of the IMSI to a binary representation and then use a number of the least significant bits of the binary representation. It should be noted that the operation b mod $2^c$ will give a number of least significant bits of b if b is a binary number and c is an integer greater than zero. It is contemplated that 11 bits of the IMSI will be sufficient for determining both the frame and the subframe in which to page a UE. Eight bits would be used for the frame hashing and three bits would be used to hash UEs among 1, 2, 4, or 8 subframes of a frame. The next column shows the portion of the IMSI that would be used to determine the paging occasion of the UE if Paging_Group_Count is equal to one. The next column shows the portion of the IMSI that would be used to determine the paging occasion of the UE if Paging Group_Count is equal to 2. As can be seen from the table, the number of bits of the IMSI used to determine the paging occasion of the UE is a function of both the DRX cycle and the paging group count. In formula 2, IMSI mod $[2^{(n+i-5)}]$ results in a number of least significant bits of the IMSI as shown in the rightmost two columns of the table. A special case occurs when Paging_Group_Count is equal to one and the DRX cycle is equal to 32. In this case, the paging occasions of a UE are those paging occasions where SFN mod 32 is equal to 0; in this case no bits of the IMSI are needed to determine the paging occasion. The last two columns in the table reference the assigned paging frames referring back to FIG. 9 and FIG. 14, respectively.

| UE | DRX cycle | IMSI | IMSI mod 2048 | IMSI portion PCG = 1 | IMSI portion PCG = 2 | Assigned frames PCG = 1 | Assigned frames PCG = 2 |
| --- | --- | --- | --- | --- | --- | --- | --- |
| 10d | 32 | 829385019238475 | 00001001011 | n/a | 1 | 940, 941, 942, 943, 944, 945, 946, 947 | 1401, 1403, 1405, 1407, 1409, 1411, 1413, 1415 |
| 10e | 32 | 123456789022222 | 11000001110 | n/a | 0 | 940, 941, 942, 943, 944, 945, 946, 947 | 1400, 1402, 1404, 1406, 1408, 1410, 1412, 1414 |
| 10f | 64 | 123451234500000 | 10110100000 | 0 | 00 | 940, 942, 944, 946 | 1400, 1404, 1408, 1412 |
| 10g | 64 | 123451234500001 | 10110100001 | 1 | 01 | 941, 943, 945, 947 | 1401, 1405, 1409, 1413 |
| 10h | 64 | 123451234500002 | 10110100010 | 0 | 10 | 940, 942, 944, 946 | 1402, 1406, 1410, 1414 |

-continued

| UE | DRX cycle | IMSI | IMSI mod 2048 | IMSI portion PCG = 1 | IMSI portion PCG = 2 | Assigned frames PCG = 1 | Assigned frames PCG = 2 |
|---|---|---|---|---|---|---|---|
| 10i | 64 | 123451234500003 | 10110100011 | 1 | 11 | 941, 943, 945, 947 | 1403, 1407, 1411, 1415 |
| 10j | 128 | 554433221100000 | 00111100000 | 00 | 000 | 940, 944 | 1400, 1408 |
| 10k | 128 | 554433221100001 | 00111100001 | 01 | 001 | 941, 945 | 1401, 1409 |
| 10l | 128 | 554433221100002 | 00111100010 | 10 | 010 | 942, 946 | 1402, 1410 |
| 10m | 128 | 554433221100003 | 00111100011 | 11 | 011 | 943, 947 | 1403, 1411 |
| 10n | 128 | 554433221100004 | 00111100100 | 00 | 100 | 940, 944 | 1404, 1412 |
| 10o | 128 | 554433221100005 | 00111100101 | 01 | 101 | 941, 945 | 1405, 1413 |
| 10p | 128 | 554433221100006 | 00111100110 | 10 | 110 | 942, 946 | 1406, 1414 |
| 10q | 128 | 554433221100007 | 00111100111 | 11 | 111 | 943, 947 | 1407, 1405 |
| 10r | 256 | 112233445500000 | 10001100000 | 000 | 0000 | 940 | 1400 |
| 10s | 256 | 112233445500001 | 10001100001 | 001 | 0001 | 941 | 1401 |
| 10t | 256 | 112233445500002 | 10001100010 | 010 | 0010 | 942 | 1402 |
| 10u | 256 | 112233445500003 | 10001100011 | 011 | 0011 | 943 | 1403 |
| 10v | 256 | 112233445500004 | 10001100100 | 100 | 0100 | 944 | 1404 |
| 10w | 256 | 112233445500005 | 10001100101 | 101 | 0101 | 945 | 1405 |
| 10x | 256 | 112233445500006 | 10001100110 | 110 | 0110 | 946 | 1406 |
| 10y | 256 | 112233445500007 | 10001100111 | 111 | 0111 | 947 | 1407 |

In an embodiment, a method for downlink paging is provided. The method includes determining a number of bits of a user equipment identifier based on an on/off cycle of a user equipment and a paging group count. The method further includes assigning a paging frame in a communications channel, where the paging frame is selected based upon the on/off cycle of the user equipment, the paging group count, and the number of bits of the user equipment identifier.

In an alternative embodiment, a method of determining a page is provided. The method includes determining a number of bits of a user equipment identifier based on an on/off cycle of a user equipment and a paging group count. The method further includes determining a paging frame in a communications channel, where the paging frame is selected based upon the on/off cycle of the user equipment, the paging group count, and the number of bits of a user equipment identifier. The method further includes evaluating the paging frame.

In an alternative embodiment, a network access equipment is provided. The network access equipment includes a processor comprising an identifier module configured to define a number of bits of a user equipment identifier based on an on/off cycle of a user equipment and a paging group count. The processor further comprises a paging frame assignment module configured to assign a paging frame in a communications channel, where the paging frame is selected based upon the on/off cycle of the user equipment, the paging group count, and the number of bits of a user equipment identifier.

In an alternative embodiment, a user equipment is provided. The user equipment includes a processor comprising an identifier module configured to determine a number of bits of a user equipment identifier based on an on/off cycle of a user equipment and a paging group count. The processor further comprises a paging frame determination module configured to determine a paging frame in a communications channel, where the paging frame is selected based upon the on/off cycle of the user equipment, the paging group count, and the number of bits of the user equipment identifier. The processor further comprises an evaluation module configured to evaluate the paging frame.

In an alternative embodiment, a method of distributed paging is provided. The method includes supporting multiple user devices, where at least two user devices have on/off cycles of different lengths. The method further includes assigning paging frames in a communication channel such that a ratio of paging frames to a total number of frames per on/off cycle is the same regardless of a length of the on/off cycle.

In an alternative embodiment, a network access equipment is provided. The network access equipment includes a processor comprising an identifier module configured to provide identities of multiple user devices, where at least two user devices have on/off cycles of different lengths. The processor further comprises a paging frame assignment module configured to assign paging frames in a communication channel such that a ratio of paging frames to a total number of frames per on/off cycle is the same regardless of the length of the on/off cycle.

In an alternative embodiment, a method of paging a plurality of user equipment with on/off cycles of different lengths is provided. The method includes assigning a number of paging frames to a paging group, where a periodicity of the number of paging frames is consistent across all of the on/off cycles of different lengths for a given paging group.

In an alternative embodiment, a network access equipment configured to page a plurality of user equipment, the user equipment having on/off cycles of different lengths, is provided. The network access equipment includes a processor comprising a paging frame assignment module configured to assign a number of paging frames to a paging group, where a periodicity of the number of paging frames is consistent across all of the on/off cycles of different lengths for a given paging group.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

The invention claimed is:

1. A method associated with downlink paging comprising:
   determining a set of bits of a user equipment identifier using an on/off cycle of a user equipment and a value transmitted by network equipment; and
   assigning a paging frame based upon the on/off cycle of the user equipment, the value, and the set of bits of the user equipment identifier.

2. The method of claim 1, wherein the on/off cycle is a DRX cycle.

3. The method of claim 1, further comprising determining the set of bits of the user equipment identifier using an international mobile subscriber identifier.

4. The method of claim 3, wherein assigning further comprises utilizing the formula SFN mod Paging_DRX_Period==(x div value)*(z), wherein x comprises a minimum DRX cycle and wherein z comprises a set of bits of the user equipment identifier, the set of bits being determined based upon the DRX cycle and the value.

5. A method of determining a page comprising:
   determining a set of bits of a user equipment identifier using an on/off cycle of a user equipment and a value transmitted by network equipment; and
   determining a paging frame based upon the on/off cycle of the user equipment, the value and the set of bits of the user equipment identifier.

6. The method of claim 5, wherein the on/off cycle is a DRX cycle.

7. The method of claim 5, further comprising determining the set of bits of the user equipment identifier using an international mobile subscriber identifier.

8. The method of claim 6, wherein determining further comprises utilizing the formula SFN mod Paging_DRX_Period==(x div value)*(z), wherein x comprises a minimum DRX cycle and wherein z comprises a set of bits of the user equipment identifier, the set of bits being determined based upon the DRX cycle and the value.

9. A network access equipment comprising:
   a processor configured to:
      determine a set of bits of a user equipment identifier using an on/off cycle of a user equipment and a value transmitted by network equipment;
      assign a paging frame based upon the on/off cycle of the user equipment, the value, and the set of bits of the user equipment identifier.

10. The network access equipment of claim 9, wherein the processor is further configured to determine the set of bits of the user equipment identifier based on the on/off cycle being a DRX cycle.

11. The network access equipment of claim 9, wherein the processor is further configured to determine the set of bits of the user equipment identifier using an international mobile subscriber identifier.

12. The network access equipment of claim 10, wherein the processor is further configured to utilize the formula SFN mod Paging_DRX_Period==(x div value)*(z), wherein x comprises a minimum DRX cycle and wherein z comprises a set of bits of the user equipment identifier, the set of bits being determined based upon the DRX cycle and the value.

13. A user equipment comprising:
   a processor configured to:
      determine a set of bits of a user equipment identifier using an on/off cycle of a user equipment and a value transmitted by network equipment; and
      determine a paging frame based upon the on/off cycle of the user equipment, the value, and the set of bits of the user equipment identifier.

14. The user equipment of claim 13, wherein the processor is further configured to determine the set of bits of the user equipment identifier based on the on/off cycle being a DRX cycle.

15. The user equipment of claim 13, wherein the processor is further configured to determine the set of bits of the user equipment identifier using an international mobile subscriber identifier.

16. The user equipment of claim 14, wherein the processor is further configured to utilize the formula SFN mod Paging_DRX_Period==(x div value)*(z), wherein x comprises a minimum DRX cycle and wherein z comprises a set of bits of the user equipment identifier, the set of bits being determined based upon the DRX cycle and the value.

17. A method associated with downlink paging comprising:
   determining a set of bits of a user equipment identifier using:
      an on/off cycle of a user equipment, and
      a value transmitted by network equipment; and
   assigning a paging frame based upon the on/off cycle of the user equipment, the value, and the set of bits of the user equipment identifier.

18. The method of claim 17, wherein the on/off cycle is a DRX cycle.

19. The method of claim 17, further comprising determining the set of bits of the user equipment identifier using an international mobile subscriber identifier.

20. A method of determining a page comprising:
   determining a set of bits of a user equipment identifier using:
      an on/off cycle of a user equipment, and
      a value transmitted by network equipment; and
   determining a paging frame based upon the on/off cycle of the user equipment, the value and the set of bits of the user equipment identifier.

21. The method of claim 20, wherein the on/off cycle is a DRX cycle.

22. The method of claim 20, further comprising determining the set of bits of the user equipment identifier using an international mobile subscriber identifier.

* * * * *